(12) United States Patent
Feilkas et al.

(10) Patent No.: US 8,055,046 B2
(45) Date of Patent: Nov. 8, 2011

(54) SHAPE RECONSTRUCTION USING X-RAY IMAGES

(75) Inventors: Thomas Feilkas, Grafing (DE); Guoyan Zheng, Bern (CH)

(73) Assignees: Brainlab AG, Feldkirchen (DE); AO Technology AG, Chur (CH)

( * ) Notice: Subject to any disclaimer, the term of this patent is extended or adjusted under 35 U.S.C. 154(b) by 1159 days.

(21) Appl. No.: 11/762,817

(22) Filed: Jun. 14, 2007

(65) Prior Publication Data

US 2008/0018643 A1 Jan. 24, 2008

Related U.S. Application Data

(60) Provisional application No. 60/826,786, filed on Sep. 25, 2006.

(30) Foreign Application Priority Data

Jun. 14, 2006 (EP) .................................... 06012256

(51) Int. Cl.
*G06T 17/00* (2006.01)
(52) U.S. Cl. ........................................ 382/131; 345/420
(58) Field of Classification Search .................. 382/113, 382/154, 131; 345/420
See application file for complete search history.

(56) References Cited

U.S. PATENT DOCUMENTS

| | | | |
|---|---|---|---|
| 4,791,934 A | 12/1988 | Brunnett | |
| 5,772,594 A | 6/1998 | Barrick | |
| 5,784,431 A | 7/1998 | Kalend et al. | |
| 5,799,055 A | 8/1998 | Peshkin et al. | |
| 5,951,475 A * | 9/1999 | Gueziec et al. | 600/425 |
| 5,967,982 A | 10/1999 | Barnett | |
| 6,825,838 B2 * | 11/2004 | Smith et al. | 345/419 |
| 7,317,819 B2 * | 1/2008 | Janes | 382/128 |
| 7,333,648 B2 * | 2/2008 | Edic et al. | 382/131 |
| 7,542,791 B2 * | 6/2009 | Mire et al. | 600/407 |
| 7,660,623 B2 * | 2/2010 | Hunter et al. | 600/424 |
| 2003/0185346 A1 | 10/2003 | Vilsmeier | |

(Continued)

FOREIGN PATENT DOCUMENTS

DE 196 39 615 4/1998

(Continued)

OTHER PUBLICATIONS

Chui et al., "A New Algorithm for Non-Rigid Point Matching", Proceedings 2000 IEEE Conference on Computer Vision and Pattern Recognition vol. 2, Jun. 2000, pp. 44-51.

(Continued)

*Primary Examiner* — Stephen Koziol
(74) *Attorney, Agent, or Firm* — Renner, Otto, Boisselle & Sklar, LLP (57) ABSTRACT

A method for generating a three-dimensional model of a structure based on at least one two-dimensional image of the structure includes obtaining a general three-dimensional model of the structure; determining at least one image feature from the at least one two-dimensional image; determining an orientation of the general three-dimensional model of the structure relative to the at least one two-dimensional image of the structure so that at least one image feature of a two-dimensional projection of the three-dimensional model match or at least approximate the at least one two-dimensional image feature; and after determining the orientation of the general three-dimensional model, morphing a form or shape of the general three-dimensional model to fit the at least one two-dimensional image.

18 Claims, 5 Drawing Sheets

U.S. PATENT DOCUMENTS

2005/0004451 A1 1/2005 Vilsmeier et al.
2005/0008219 A1 1/2005 Pomero et al.

FOREIGN PATENT DOCUMENTS

WO 01/22368 3/2001

OTHER PUBLICATIONS

Fleute, M. et al., "Nonrigid 3-D/2-D Registration of Images Using Statistical Models", Lecture Notes in Computer Science, Sep. 1999, pp. 138-147.

Lowe, D.G., "Fitting Parameterized Three-Dimensional Models to Images", IEEE Transactions on Pattern Analysis and Machine Intelligence, vol. 13, No. 5, May 1991, pp. 441-450.

Xenophon Papademetris et al., "Estimation of 3-D Left Ventricular Deformation From Medical Images Using Biomechanical Models", IEEE Transactions on Medical Imaging, vol. 21, No. 7, Jul. 2002, pp. 786-800.

Penney, G.P. et al., "Deforming a Preoperative Volume to Represent the Intraoperative Scene", Computer Aided Surgery, vol. 7, No. 2, 2002, pp. 63-73.

Guoyan Zheng et al., "Use of a Dense Surface Point Distribution Model in a Three-Stage Anatomical Shape Reconstruction from Sparse Information for Computer Assisted Orthopaedic Surgery: A Preliminary Study", ACCV, Jan. 2006, pp. 52-60.

Wunsch et al., "Registration of CAD-Models to Images by Iterative Inverse Perspective Matching", Proceedings of the 13th International Conference on Pattern Recognition, vol. 1, 1996, pp. 78-83.

* cited by examiner

SHAPE RECONSTRUCTION USING X-RAY IMAGES

RELATED APPLICATION DATA

This application claims priority of U.S. Provisional Application No. 60/826,786 filed on Sep. 25, 2006, which is incorporated herein by reference in its entirety.

FIELD OF THE INVENTION

The present invention relates generally to medical imaging, and more particularly to a method and apparatus for generating a three-dimensional (3D) model based on at least one two-dimensional (2D) image, such as the construction of a patient-specific three-dimensional model of a bone surface from one or more two-dimensional calibrated fluoroscopic images.

BACKGROUND OF THE INVENTION

Computer-assisted stereotactic systems that work with the aid of body structure data obtained from tomographic detection systems and with the assistance of X-ray images produced in situ are known, for example, from U.S. Pat. No. 4,791,934 and U.S. Pat. No. 5,799,055. Furthermore, x-ray imaging used to assist in operations is discussed in U.S. Pat. Nos. 5,967,982; 5,772,594; and 5,784,431.

Where accurate medical navigation is to be provided, the prior art still works with the aid of body structure data originating from tomographic detection systems such as, for example, computer tomography devices or nuclear spin tomography devices. The patient to be treated may be positionally registered in situ with respect to previously determined image data, and operating instruments then may be virtually displayed in the same relation to the image data as to the actual patient. This can make the body structure data and/or X-ray image data useful to the surgeon in the operating room.

A disadvantage of methods in which tomographs (CT, MR) or X-ray images are produced specifically for navigation within the framework of treatment is that it increases a radiation load on the patient. Further, such devices incur high costs, since they are very expensive to purchase and maintain.

Attempts have been made to develop systems that may be employed without using previously detected body structure data, for example, based on statistical models of image data sets for body structures. However, such systems can lack the required accuracy for the respective patient to be treated.

Constructing the bone surface from a few calibrated fluoroscopic images can be a challenging task. A priori information is often required to handle this problem. In Fleute M. and Lavallée S.: Nonrigid 3D/2D registration of images using a statistical model. Lecture Notes in Computer Science, Vol. 1679, Springer (1999) 138-147, a PDM of the distal femur was iteratively fitted to the contours of segmented X-ray views by sequentially optimizing the rigid and non-rigid parameters.

In Benameur S., Mignotte M., Parent S. et al.: 3D/2D registration and segmentation of scoliotic vertebra using statistical models. Comput Med Imag Grap, Vol. 27, (2003) 321-337 and Benameur S., Mignotte M., Parent S., et al.: A hierarchical statistical modeling approach for the unsupervised 3D reconstruction of the scoliotic spine. ICIP '04 (2004), 561-564, a PDM of scoliotic vertebrae was fitted to two conventional radiographic views by simultaneously optimizing both shape and pose parameters. The optimal estimation was obtained by iteratively minimizing a combined energy function, which is the sum of a likelihood energy term measured from an edge potential field on the images and a prior energy term measured from the statistical shape models. No explicit image-to-model correspondence was used. To avoid trapping in a local minimal, the method requires a close initialization.

US 2003/0185346 A1 discloses a method for computer-assisted medical navigation and pre-operative treatment planning, wherein the current position of a patient or a part of a patient's body and the positions of medical treatment devices or treatment-assisting devices are detected by means of a position detection unit, and wherein said detected positional data are assigned to body structure data, in order to jointly use said body structure data in assignment with said positional data, within the context of assisting the treatment, wherein body structure data is used that is obtained based on a generic model that has been adapted by linking it with patient-characteristic detection data.

US 2005/0004451 A1 discloses a method for computer-assisted medical navigation or pre-operative treatment planning, wherein a position of a patient or a part of a patient's body is detected; positions of medical treatment devices or treatment-assisting devices are detected; and the detected positions are assigned to body structure data, said body structure data being obtained form a three-dimensional generic model.

WO 01/22368 A1 discloses a method and a system for three-dimensional reconstruction of an image representing the surface contours of an object from a two-dimensional view of said object obtained by X-ray, which consists of: determining the position of the photographing source in a reference repository; selecting a predefined model constituting a mean form of the object, and repeating the process until the contours of the model are such that the variations between the overhead projection rays of the contours of the two-dimensional image from the source and the model surface are minimal; selecting an orientation and a position for the model in the reference repository; and then selecting a deformation of the model to modify its contours in three dimensions.

US 2005/0008219 A1 discloses a radiographic imaging method for three-dimensional reconstruction in which the three-dimensional shape of a model representing an object is calculated from a geometrical model of the object that is known a priori, and obtained from a confinement volume of the object estimated from a geometrical pattern visible in two images and from knowledge of the positions of the sources. A geometrical model can be used that comprises information that enables use of an estimator to establish a geometrical characteristic for the model representing the object.

SUMMARY OF THE INVENTION

The present invention can be used in computer-assisted medical navigation and/or pre-operative treatment planning. In general terms, the current position of a patient or a part of a patient's body and the positions of medical treatment devices or treatment-assisting devices can be detected in such navigation methods by means of a position detection unit. The detected positional data can be assigned to body structure data, which, for example, can be a model of a bone surface, in order to jointly use the body structure data in assignment with the positional data within the context of assisting the treatment. An exemplary navigation system is described for example in DE 196 39 615 C2.

A method for generating a three-dimensional model of an object or a structure is provided, wherein the method may be based on at least one two-dimensional image of the real three-dimensional object or structure. For example, a generic or statistically generated three-dimensional model of the object, such as for example a Point Distribution Model (PDM) of a bone surface, can be provided from a data base. The statistical model can be obtained, for example, by collecting data in the form or shape of a structure and calculating an "average" structure. At least one two-dimensional image (preferably calibrated), such as an X-ray or fluoroscopic image of a patient or a body structure, for example, can be obtained, wherein image features of the at least one two-dimensional image, such as silhouette, contour, shape or outline of the imaged object (e.g., the outline of a bone structure) may be determined or obtained. The orientation of the three-dimensional model then can be determined relative to the two-dimensional image so that the silhouette or contour of the three-dimensional model, when projected onto the image plane, best matches the two-dimensional features, e.g., the contour or outline of the patient-specific imaged bone structure.

Preferably, only rigid matching is performed to find a best or at least a good orientation of the three-dimensional model relative to the at least one two-dimensional image. Elastic matching is performed preferably only after the orientation of the three-dimensional model has been determined to fit the projection of the three-dimensional model to the two-dimensional image. Rigid matching can be performed as a first step, while elastic matching, including the deformation of the three-dimensional model, preferably is conducted only after the best or a good orientation or position of the three-dimensional model in relation to the two-dimensional image is found. The rigid matching itself can use an iterative approach, wherein the elastic matching, which can be more complicated to perform, can directly calculate the shape deformation in a single step, thus saving time.

The image-to-model correspondence establishing algorithm described herein is not only faster than conventional methods, but also improves the robustness with respect to certain outliers and automatic exclusion of cross matching, which is an important property for the preservation of the topology.

One embodiment of the invention relates to the reconstruction of a patient-specific three-dimensional (3D) bone surface from two-dimensional (2D) calibrated fluoroscopic images and a point distribution model (PDM). A 2D/3D reconstruction scheme combining statistical extrapolation and regularized shape deformation with an iterative image-to-model correspondence establishing algorithm can be used to reconstruct the surface of a bone structure, e.g., the proximal femur. The image-to-model correspondences can be established using a non-rigid 2D point matching process. This process can iteratively use a symmetric injective nearest-neighbor mapping operator and 2D thin-plate spline based deformation to find a fraction of best matched 2D point pairs between features detected from the fluoroscopic images and those extracted from the 3D model. The obtained 2D point pairs then can be used to set up a set of 3D point pairs such that a 2D/3D reconstruction problem can be turned to a 3D/3D reconstruction. It is noted that in general no explicit contour extraction is required.

Point Distribution Model (PDM)

An exemplary PDM can be constructed from a training database, e.g., a training database consisting of 30 proximal femoral surfaces from above the less trochanter. To optimally align these training surfaces, a sequence of correspondence establishing methods presented in Styner M., Rajamani K. T., Nolte L.-P., Zsemlye G., Székely G., Taylor C. J., and Davis R. H.: Evaluation of 3D correspondence methods for modeling building. In: IPMI '03, Lecture Notes in Computer Science, Vol. 2732, Springer (2003) 63-75 may be employed. Initially, a SPHARM-based parametric surface description as described in Brechbuehler C., Gerig G., Kuebler O.: Parameterization of Closed Surfaces for 3D Shape Description. Comput Vision and Image Under (1995), 61: 154-170 may be obtained, and then this surface can be optimized using Minimum Description Length (MDL) based principle as proposed by Davies R. H., Twining C. H., et al.: 3D statistical shape models using direct optimization of description length. ECCV '02, Lecture Notes in Computer Science, Vol. 2352, Springer (2002), 3-20. The contents of Styner, Brechbuehler and Davies are hereby incorporated by reference.

Following the alignment, the PDM can be constructed as follows. Let $x_i = (p_0, p_1, \ldots p_{N-1})$, $i=0, 1, \ldots, m-1$, be m (here m=30) members of the aligned training surfaces. Each member is described by a vector $x_i$ with N vertices:

$$x_i = \{x_0, y_0, z_0, x_1, y_1, z_1, \ldots, x_{N-1}, y_{N-1}, z_{N-1}\} \tag{1}$$

The PDM can be obtained by applying principal component analysis on these surfaces.

$$D = ((m-1)^{-1}) \cdot \sum_{i=0}^{m-1} (x_i - \bar{x})(x_i - \bar{x})^T \tag{2}$$

$$P = (p_0, p_1, \ldots); D \cdot p_i = \sigma_i^2 \cdot p_i$$

Where $\bar{x}$ and D represent the mean vector and the covariance matrix, respectively. Where any one instance in this space can be expressed as:

$$x = \bar{x} + \sum_{i=0}^{m-2} \alpha_i p_i \tag{3}$$

And the estimated normal distribution of the coefficients $\{\alpha_i\}$ is:

$$P(\alpha_0, \alpha_1, \ldots, \alpha_{m-2}) = (2\pi)^{-\frac{m-1}{2}} \cdot e^{-\frac{1}{2}\sum_{i=0}^{m-2}(\alpha_i^2/\sigma_i^2)} \tag{4}$$

Where $$\sum_{i=0}^{m-2} (\alpha_i^2/\sigma_i^2)$$

is the Mahalanobis distance defined on the distribution.

Image-To-Model Correspondence Establishing Algorithm

Given a few fluoroscopic images, correspondences between the input images and a model estimated from the PDM can be established. The input images may be calibrated and registered to a common coordinate system. For a pixel in an input image, a projection ray emitting from the focal point of the associated image through the pixel is always found.

A. Edge Detection

A standard implementation of the Canny edge detector with hysteresis as described in Canny J.: A computational approach to edge detection. IEEE T Pattern Anal, Vol. 8, No. 6, (1986) 679-698, which is hereby incorporated by reference, can be used to find the edge pixels of the considered bone structure from the input images. To suppress spurious edges, Gaussian convolution kernel with large width can be used to first smooth the input images. The detected edge pixels can be further processed using the knowledge about the X-ray machine. A detected edge pixel whose intensity is below some threshold or whose position is of a certain distance away from the image center can be eliminated.

B. Apparent Contour Extraction

For the fast extraction of a smooth apparent contour from a given surface model, the approach introduced by Hertzmann and Zorin, described in Hertzmann A. and Zorin D.: Illustrating smooth surfaces. In SIGGRAPH, (2000), 517-526, which is hereby incorporated by reference, can be used. This approach first constructs a dual representation of the given surface mesh in a four-dimensional (4D) space based on the position and tangent planes of every vertex. The focal point's dual (a plane in 4D) intersects with the mesh triangle's dual. Beforehand, the approach normalizes the dual vertices using the $L_\infty$ norm so that the vertices end up on one of the unit hypercube's sides. This reduces the problem to intersecting the triangles on a hypercube's side with the focal point's dual plane, i.e., to intersect triangles in eight 3D unit cubes (the eight hypercube sides) with a plane. By using Octree for each hypercube side, the extraction process can be greatly sped up. An example is given in FIG. 4.

Then, for a point $\Omega^s_j$, (j=1, 2, ..., M) on the extracted apparent contours using the projection parameters of the $s^{th}$ input X-ray image, a forward projection of this point onto image s to get its 2D position $A^s_j$ may be performed. Each 2D point in $\{A^s_j\}$ then can be associated to a 3D point in $\{\Omega^s_j\}$. In the sub-section followed, an iterative matching process for building the 2D association between the points in $\{A^s_j\}$ and the detected edge pixels in the X-ray image s will be described.

C. Iterative Non-Rigid 2D Matching Process

Following the general framework of point matching described in Chui H., Rambo J., Duncan J., Schultz R., and Rangarajan A.: Registration of cortical anatomical structures via robust 3D point matching. In: IPMI '99, Lecture Notes in Computer Science, Vol. 1613, Springer (1999): 168-181, which is hereby incorporated by reference, the 2D matching can be considered as a two-stage process: correspondence and spatial mapping. TPS can be used here for parameterization of the spatial mapping. But unlike described in Chui H., et al., the correspondence problem can be solved differently. To make the description simple, the detected edge pixels in image s are denoted as $I^s=\{I^s_i, i=1, 2, \ldots, N\}$ and the 2D projection of the apparent contours as $A^s=\{A^s_j, j=1, 2, \ldots, M\}$. Here the 2D matching in one image is focused. The overall correspondence can be established by combining matched point pairs found in all input images.

Definition 1: Injective nearest-neighbor (IN). A point $I^s_i$ can only be matched to at most one point of $A^s$ and this point must be the closest one in $A^s$ to $I^s_i$.

Definition 2: Cross-matching. Assume there are two matched pairs $(I^s_i, A^s_j)$ and $(I^s_m, A^s_n)$. If the line segment from $I^s_i$ to $A^s_j$ intersects at a point with the line segment from $I^s_m$ to $A^s_n$, this event is defined as cross-matching.

Definition 3: Symmetric Injective nearest-neighbor (SIN). $I^s_i$ and $A^s_j$ is a symmetric injective nearest-neighbor if and only if $A^s_j$ is the closest point in $A^s$ to $I^s_i$ and $I^s_i$ is the closest point in $I^s$ to $A^s_j$.

Definition 4: Symmetric injective nearest-neighbor mapping operator (SIN-MO). The action of finding a number of SIN's from two points set is defined as symmetric inject nearest-neighbor mapping operator.

Statement 1: If SIN-MO is applied on two point sets to find a number of matched point pairs, all of them are one-to-one mapping.

Statement 2: If SIN-MO is applied on two point sets to find a number of matched point pairs, there is no cross-matching.

The overall iterative non-rigid 2D matching process can be described as follows.

Input: two point sets $I^s$ and $A^s$, and a weight parameter $\lambda$.
Output: a list of 2D matched point pairs
Initialization: The centroids of $I^s$ and $A^s$ are calculated first, and then $A^s$ is translated so that its centroid is aligned with the centroid of $I^s$
Iteration: It is a dual update process taking those points $I^s$ as references.
Stage 1: Update the correspondence: Applying SIN-MO on $I^s$ and $A^s$ to find a number of SINs. The set of SINs is denoted as $\{(I^s_a, A^s_a); a=1, 2, \ldots, K\}$
Stage 2: Update the positions of all points in $A^s$
This can be done in a two-step procedure.
A. Compute a 2D TPS-based spatial mapping f using the estimated set of SINs by minimizing the following cost function:

$$E_{2D-TPS}(f) = \sum_a^K \|I^s_a - f(A^s_a)\|^2 + \lambda \int\int\left[\left(\frac{\partial^2 f}{\partial x^2}\right)^2 + \left(\frac{\partial^2 f}{\partial x \partial y}\right)^2 + \left(\frac{\partial^2 f}{\partial y^2}\right)^2\right]dxdy$$

B. Update the positions of all points in $A^s$ based on the estimated TPS transformation f Repeat stage 1 and 2 certain times (e.g. 30) or until convergence.

D. 3D Point Pair Building

Figures 4, 5:
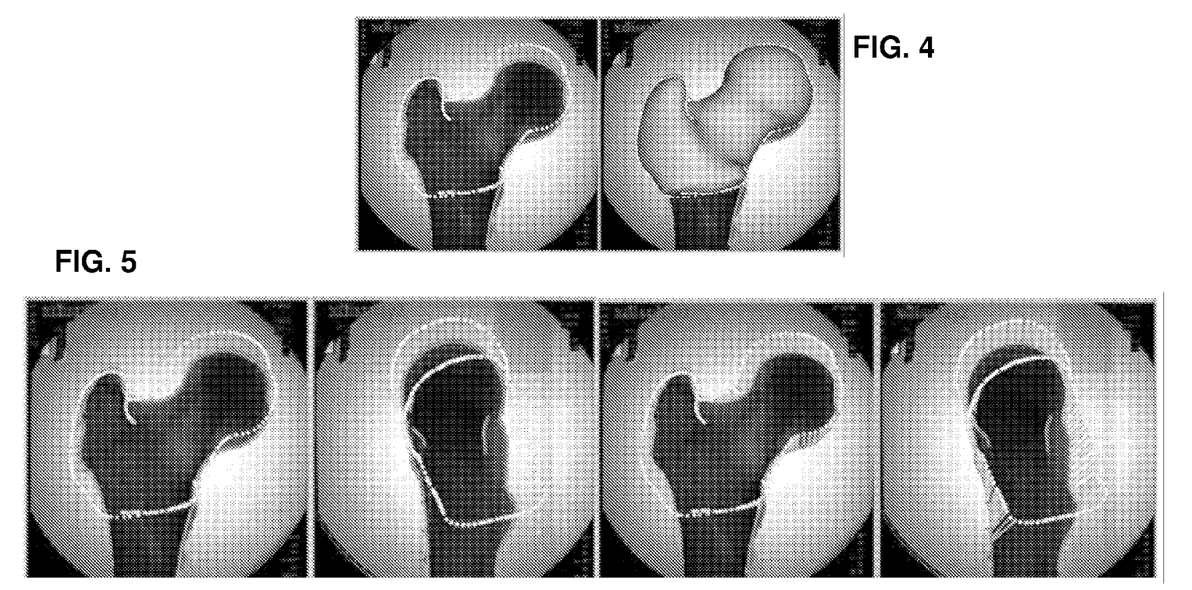
FIG. 4 illustrates edge pixels, a three-dimensional surface model and extracted apparent contours of a proximal femur in accordance with the invention.
FIG. 5 illustrates establishment of 2D/3D correspondences in accordance with the invention.

Assuming a set of 2D matched point pairs $\{(I^s_b, A^s_b); b=1, 2, \ldots, L\}$ have been found, the corresponding 3D point pairs may be built as follows. For a 2D point $I^s_b$, a projection ray $r^s_b$ can be found emitting from the focal point of image s through point $I^s_b$. Additionally, for its matched point $A^s_b$, the associated 3D point $\Omega^s_b$ on the apparent contour of the model whose projection onto the image s is $A^s_b$ is always known. By computing a point $v^s_b$ on the ray $r^s_b$ which has the shortest distance to $\Omega^s_b$, a 3D point pair $(v^s_b, \Omega^s_b)$ can be built. Combining all these 3D point pairs, the 2D/3D correspondence between the input images and a 3D model estimated from the PDM can be established. An example is shown in FIG. 5.

3D/3D Reconstruction

Using the developed algorithm for establishing correspondence, a set of 3D point pairs given an initial model state, i.e., the initial scale and the initial pose, parameters of the point distribution model always can be found. The problem of surface reconstruction is then solved optimally in three stages as presented in Zheng G., Rajamani K. T. and Nolte L.-P.: Use of a dense surface point distribution model in a three-stage anatomical shape reconstruction from sparse information for computer-assisted orthopedic surgery: a preliminary study. In ACCV '06, Lecture Notes in Computer Science, Vol. 3852, Springer (2006) 52-60. affine registration, statistical extrapolation, and regularized shape deformation, which is hereby incorporated by reference.

A. Affine Registration

This stage can be solved by iteration. In this stage, the scale and the rigid registration transformation between the mean model of the PDM and the input images may be iteratively determined using a generalization of the Iterative Closest Point (ICP) algorithm developed by Guéziec et al. described in Guéziec A., Kazanzides P., Williamson B., and Taylor R. H.: Anatomy-based registration of CT-scan and intraoperative X-ray images for guiding a surgical robot. IEEE T Med Imag¬ing, Vol. 17, No. 5, (1998) 715-728, which is hereby incorporated by reference. The difference between this algorithm and the traditional ICP algorithm is that in each iteration a set of new point pairs using the present algorithm for building 2D/3D correspondences is set up.

B. Statistical Extrapolation

Based on the estimated scale and pose information from the first stage, the correspondence establishing algorithm can be used to obtain a set of n 3D point pairs from all input images. The points computed from the image data are denoted as $v'=\{v'_i=(x'_i,y'_i,z'_i); i=0, 1, \ldots n-1\}$ and these are called the image points. Those points on the mean model of the PDM are denoted as $=\{(\overline{x}_j)_i); 0 \leq j \leq N-1; i=0, 1, \ldots, n-1\}$ and these are called the model points, where N is the number of points of the mean model; n is the number of the point pairs; $(x_j)_i$ means that the j th model point $\overline{xj}$ on the mean model $\overline{x}$ is the closest point to the i th image point $v'_i$. The statistical extrapolation may be formulated as the minimization of the following joint cost function:

$$E_\alpha(\overline{x}', v', x) = \rho \cdot \log(3n) \cdot E(\overline{x}', v', x) + E(x); x = \overline{x} + \sum_{k=0}^{m-2} \alpha_k p_k \quad (6)$$

$$E(\overline{x}', v', x) = (n^{-1}) \sum_{i=0}^{n-1} \left\| v'_i - ((\overline{x}_j))_i + \sum_{k=0}^{m-2} \alpha_k \cdot p_k(j) \right\|^2$$

$$E(x) = (1/2) \cdot \sum_{k=0}^{m-2} (\alpha_k^2 / \sigma_k^2)$$

where the first term is the likelihood energy term and the second term is the prior energy term (or the stabilization term), used to constrain the estimated shape to a realistic result. ρ is a parameter that controls the relative weighting between these two terms. $p_k(j)$ is the $j^{th}$ tuple of the $k^{th}$ shape basis eigenvector. For details on how to solve Equation. (6), reference is made to Zheng G., Rajamani K. T. and Nolte L.-P.: Use of a dense surface point distribution model in a three-stage anatomical shape reconstruction from sparse information for computer-assisted orthopedic surgery: a preliminary study. In ACCV '06, Lecture Notes in Computer Science, Vol. 3852, Springer (2006) 52-60, which is hereby incorporated by reference.

C. Regularized Shape Deformation

Similar to the second stage, first image-to-model correspondence between a template surface estimated the input images and the PDM set up by optimizing Equation (6). To keep the same denotation, it is assumed that the image points are $v'=\{v'_i=(x'_i,y'_i,z'_i); i=0, 1, \ldots, l-1\}$ and that the model points are $v=\{v_i=(x_j)_i=(x_i,y_i,z_i); i=0, 1, \ldots, l-1\}$, where l is the number of point pairs and $(x_j)_i$ means that the $j^{th}$ model point $x_j$ on the statistically extrapolated surface x is the closest point to the $i^{th}$ image point $v_i'$. The regularized shape deformation is described as a regression problem of finding a spatial transform t: $R^3 \Rightarrow R^3$ that minimizes the following cost function:

$$E(t) = (l^{-1}) \sum_{i=0}^{l-1} \|v'_i - t(v_i)\|^2 + \tau \cdot \frac{\log(m)}{\log(3l)} \cdot L[t] \quad (7)$$

Where $\tau \geq 0$ is a parameter controlling the fitting quality and the regularization constraint; m is the number of training surfaces; $t(v)=\{t(v_i)\}$ are the results of applying the mapping on the model points and L[t] is a thin-plate splines based regularization functional defined on the nonlinear mapping t and has following form; see also Bookstein F. Principal warps: thin-plate splines and the decomposition of deformations. IEEE T Pattern Anal. Vol. 11, (1989) 567-585.

$$L[t] = \int \int \int_{R^3} (I(t)) dx\, dy\, dz$$

$$I(\cdot) = \begin{pmatrix} \left(\frac{\partial^2}{\partial x^2}\right)^2 + 2\left(\frac{\partial^2}{\partial x \partial y}\right)^2 + \left(\frac{\partial^2}{\partial y^2}\right)^2 + \\ 2\left(\frac{\partial^2}{\partial y \partial z}\right)^2 + \left(\frac{\partial^2}{\partial z^2}\right)^2 + 2\left(\frac{\partial^2}{\partial z \partial x}\right)^2 \end{pmatrix}$$

For details on how to solve Equation (7), reference is made to Zheng G., Rajamani K. T. and Nolte L.-P.: Use of a dense surface point distribution model in a three-stage anatomical shape reconstruction from sparse information for computer-assisted orthopedic surgery: a preliminary study. In ACCV '06, Lecture Notes in Computer Science, Vol. 3852, Springer (2006) 52-60, which is hereby incorporated by reference.

According to a further aspect of the invention, there is provided a computer program which, when loaded or running on a computer, performs or supports the method as set forth above. Furthermore, another aspect of the invention relates to a program storage medium or computer program product comprising such a program.

Figure 2:
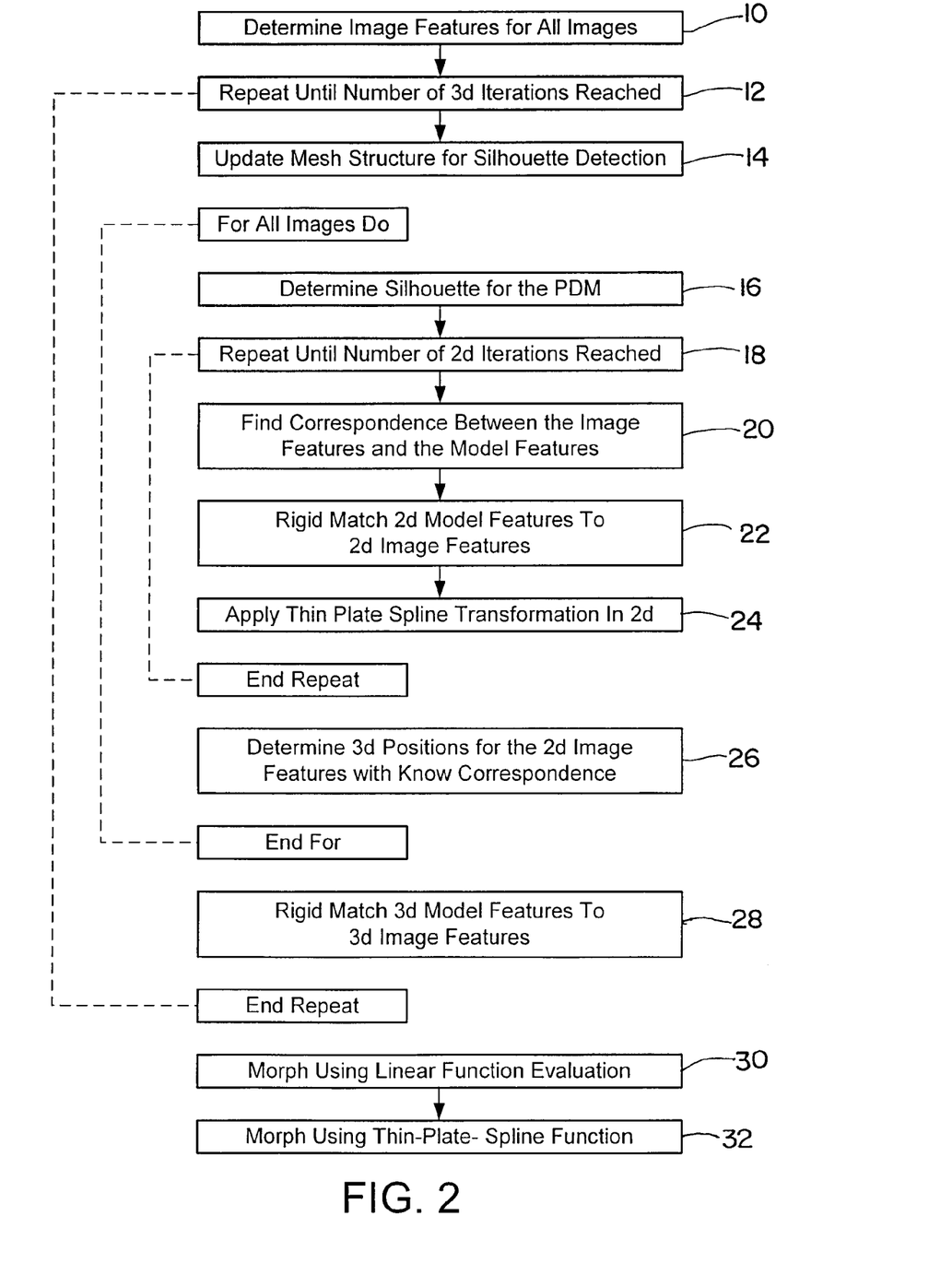
FIG. 2 is a flow chart illustrating an exemplary algorithm in accordance with the invention.

An exemplary algorithm in accordance with the invention is shown in FIG. 2.

An apparatus for generating a three-dimensional model based on at least one two-dimensional image comprises a device to obtain one or more two-dimensional images of a patient, such as two-dimensional calibrated fluoroscopic images from a C-arc, for example. This device for obtaining two-dimensional patient-specific images can be operatively coupled to a computer that also is operatively coupled to a database from which a three-dimensional general model of the imaged patient-specific body structure may be obtained. This computer can perform the method set forth above and output the obtained morphed three-dimensional model for further use (e.g., output on a display to show the morphed three-dimensional model or navigation software such as Vector Vision of the applicant).

BRIEF DESCRIPTION OF THE DRAWINGS

The forgoing and other features of the invention are hereinafter discussed with reference to the drawing.

DETAILED DESCRIPTION

Figure 1:
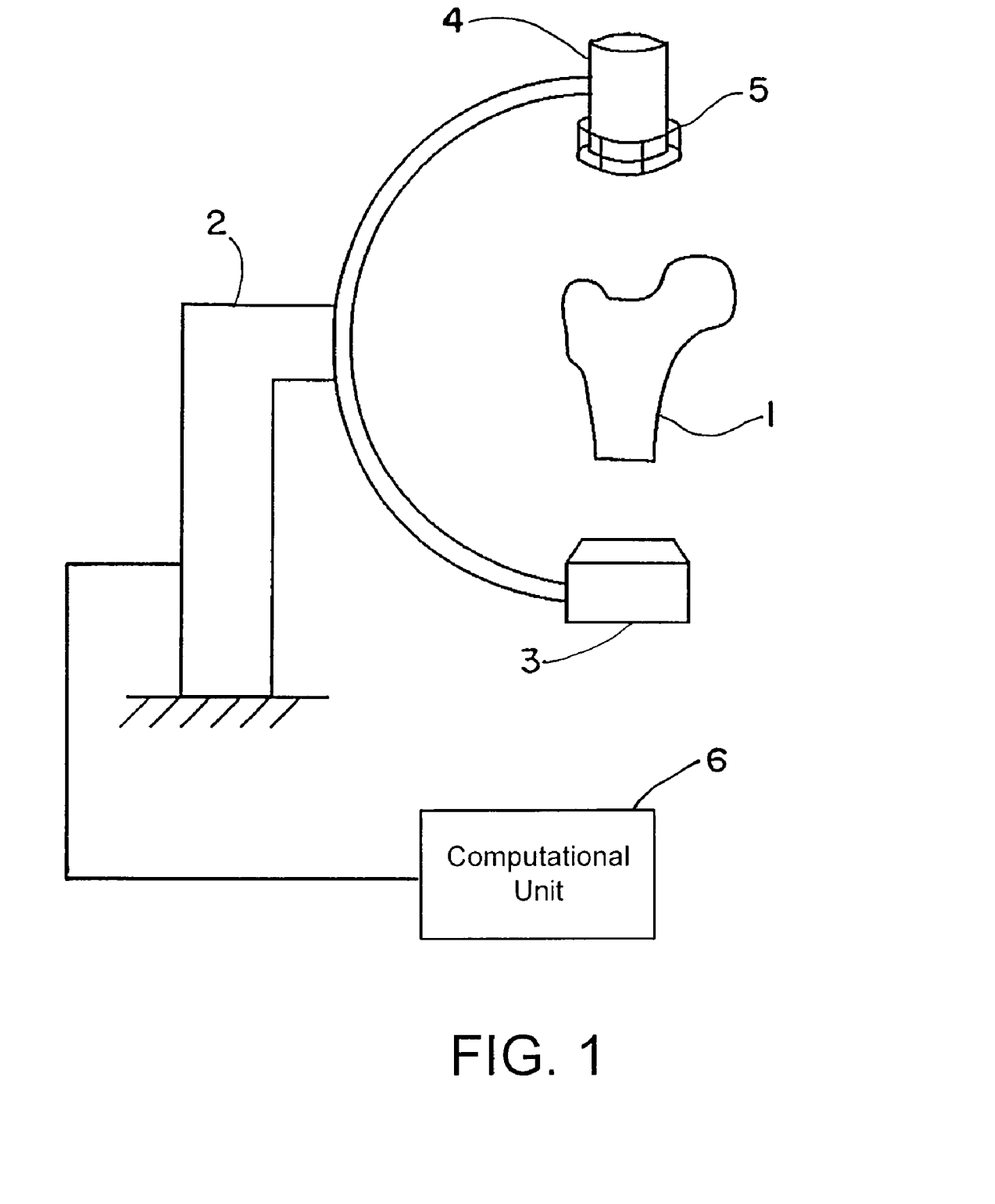
FIG. 1 is a schematic diagram illustrating an exemplary apparatus for two-dimensional image acquisition coupled to a computational unit in accordance with the invention.

FIG. 1 shows an exemplary C-arc apparatus that can be used to obtain patient-specific X-ray images. An anatomic structure of interest, e.g., the proximal femur 1 of the patient, can be placed in the imaging unit 2. This imaging unit 2 may include a radiation source 3 and a detection device 4. A calibration device 5 connected to the detection device 4 can be used to determine the imaging parameters. The calibration device 5 may be placed anywhere between the radiation source 3 and the detection device 4, and attachment to the detection device is merely exemplary. Operatively coupled to the C-arc apparatus is a computational unit 6 that executes the algorithm described herein.

The image(s) obtained from the imaging device 2 can be used as input for the algorithm of FIG. 2 and executed by the computational unit 6. Beginning at block 10, image figures such as the shape, contour, outline or edge or gradients may be determined for all obtained two-dimensional images. At block 12, rigid matching can be performed so that, for example, only the position (rotation and translation) and/or the scaling of a three-dimensional model are changed. This iterative process can be repeated until a predetermined or established number of 3D iterations is reached. Next at block 14, the mesh structure of the statistical Point Distribution Model is updated for the silhouette detection. For all images in the exemplary embodiment the silhouette for the PDM is detected.

The steps of finding a correspondence between the image features and model features and rigid matching 2D model features to 2D image features and applying a thin-plate-spline-transformation in 2D are repeated until a predetermined or calculated number of two-dimensional iterations is reached, as indicated at blocks 16-24. Subsequently, the three-dimensional positions for the two-dimensional features with known correspondence are determined as indicated at block 26.

After these steps have been performed for all images, rigid matching of three-dimensional model features to the three-dimensional image feature can be performed at block 28, which may be repeated until a predetermined, calculated or established number of three-dimensional iterations is reached.

The algorithm can be performed as set forth for the described embodiment without morphing or performing any non-rigid deformation on the three-dimensional model to find the orientation of the three-dimensional model relative to the patient specific two-dimensional image. This allows fast processing of the obtained two-dimensional image(s).

After the orientation, scaling and position of the three-dimensional model has been found using the above described algorithm, then at blocks 30-32 the three-dimensional model can be morphed using linear function evaluation and thin-plate-spline transformation so that the process of morphing, which is time consuming, is only performed a single time at the end of the algorithm.

Figure 3:
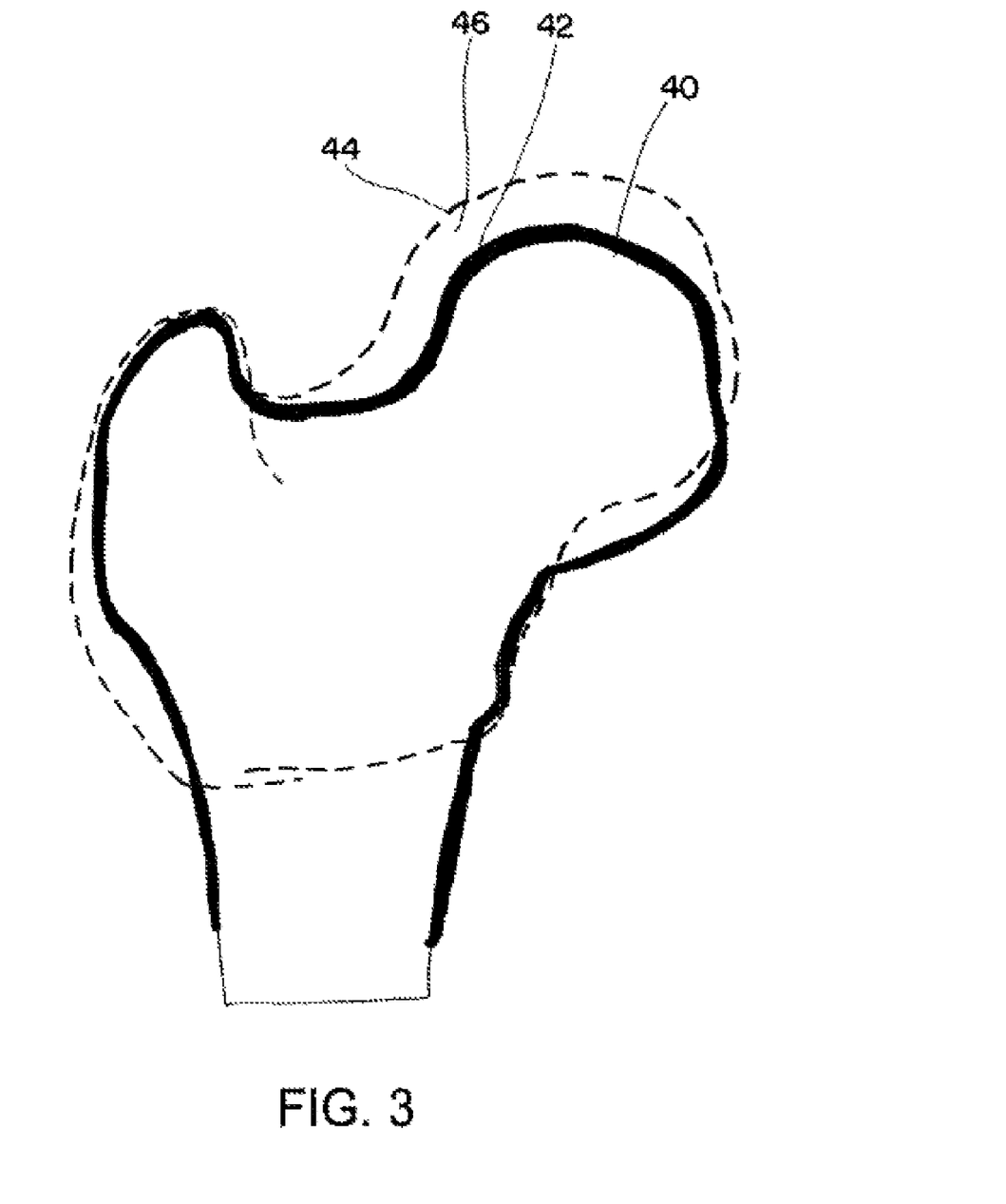
FIG. 3 illustrates an exemplary finding of 2D-2D correspondences on a proximal femur in accordance with the invention.

FIG. 3 shows an exemplary X-ray image of a proximal femur 40 with detected image features or contour line 42. The silhouette of the statistical model has been projected into the image plane as points 44. The correspondences between the model silhouette 44 and the image features are shown by the reference indicator 46.

For verification purposes of the method, three fluoroscopic images were acquired for each of a number of eleven cadaveric femurs: the first one along the anterior-posterior (AP) direction, the second one along the lateral-medial (LM) direction, and the last one from an oblique angle in between the AP and the LM directions. All acquired images were calibrated and registered to an associated reference coordinate system. In all reconstructions, three controlling parameters are set as follows: $\lambda=0.5$, $\rho=0.05$, and $\tau=0.05$.

Two experiments using a different number of images were performed for each bone. In the first experiment only AP and LM images were used to reconstruct the surface of the bone. In the second one, all three images were used.

Figure 6:
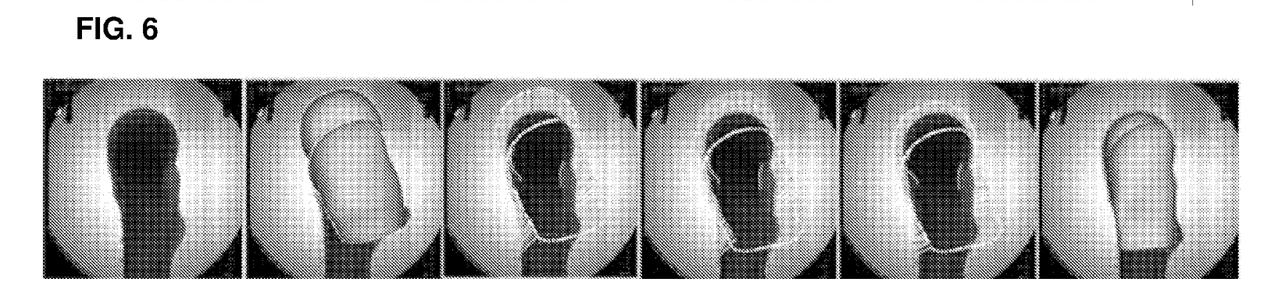
FIG. 6 shows different stages of reconstruction (from left to right: acquired images, initialization of the mean model of the PDM; after establishing image-to-model correspondence; after 3D paired point matching; after re-establishing correspondence; and final reconstruction result after a series of computations).

The reconstruction accuracies were evaluated by randomly digitizing 100 to 200 points from each surface of the cadaveric specimen and then computing the distance from those digitized points to the associated surface reconstructed from the images. The median and mean reconstruction errors of both experiments are presented in Table 1 below. An average mean reconstruction error of 1.2 mm was found when two images were used. The error decreased to 1.0 mm when three images were used. Different stages of one reconstruction example are presented in FIG. 6.

TABLE 1

Reconstruction errors when different number of images were used

| | Bone Index | | | | | | | | | | |
|---|---|---|---|---|---|---|---|---|---|---|---|
| | 1 | 2 | 3 | 4 | 5 | 6 | 7 | 8 | 9 | 10 | 11 |
| Reconstruction errors when only AP and LM images were used | | | | | | | | | | | |
| Median (mm) | 1.3 | 0.8 | 1.5 | 1 | 1.3 | 1 | 1.1 | 1 | 0.8 | 1.1 | 1.2 |
| Mean (mm) | 1.5 | 0.8 | 1.4 | 1.3 | 1.4 | 1.2 | 1.2 | 1.2 | 1 | 1.1 | 1.6 |
| Reconstruction errors when all three images were used | | | | | | | | | | | |
| Median (mm) | 1.3 | 0.7 | 0.7 | 1.1 | 1 | 1.1 | 0.8 | 0.9 | 0.7 | 1 | 0.9 |
| Mean (mm) | 1.3 | 0.7 | 0.8 | 1.2 | 1.1 | 1.1 | 1.1 | 0.9 | 0.9 | 1.1 | 1.2 |

Figure 7:
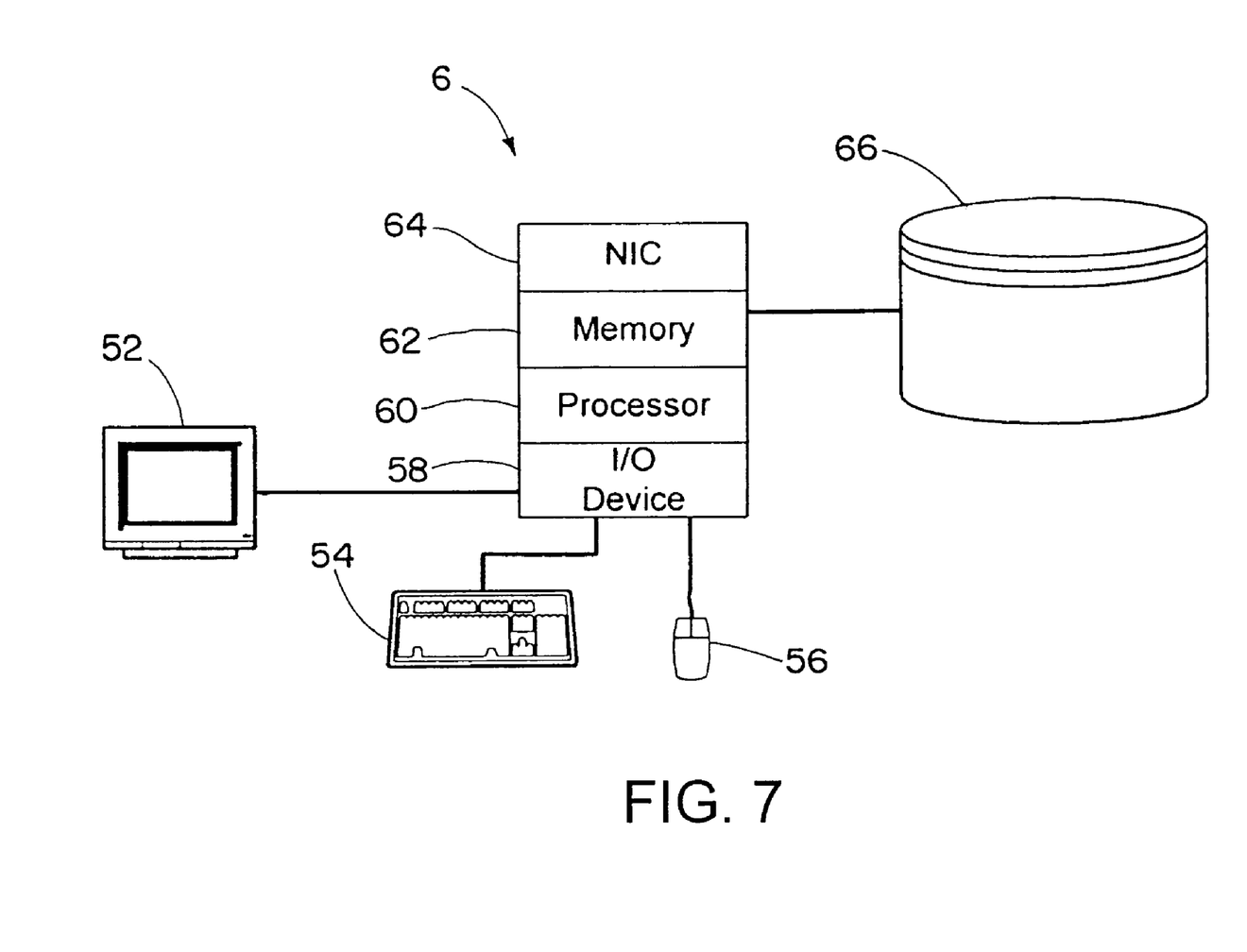
FIG. 7 is a block diagram of an exemplary computer system that can be used to carry out the method in accordance with invention.

Moving now to FIG. 7 there is shown a block diagram of an exemplary computational unit 6 that may be used to implement one or more of the methods described herein. The computational unit 6 may include a display 52 for viewing system information, and a keyboard 54 and pointing device 56 for data entry, screen navigation, etc. A computer mouse or other device that points to or otherwise identifies a location, action, etc., e.g., by a point and click method or some other method, are examples of a pointing device 56. Alternatively, a touch screen (not shown) may be used in place of the keyboard 54 and pointing device 56. The display 52, keyboard 54 and mouse 56 communicate with a processor via an input/output device 58, such as a video card and/or serial port (e.g., a USB port or the like).

A processor 60, such as an AMD Athlon 64® processor or an Intel Pentium IV® processor, combined with a memory 62 execute programs to perform various functions, such as data entry, numerical calculations, screen display, system setup, etc. The memory 62 may comprise several devices, including volatile and non-volatile memory components. Accordingly, the memory 62 may include, for example, random access memory (RAM), read-only memory (ROM), hard disks, floppy disks, optical disks (e.g., CDs and DVDs), tapes, flash devices and/or other memory components, plus associated drives, players and/or readers for the memory devices. The processor 60 and the memory 62 are coupled using a local interface (not shown). The local interface may be, for example, a data bus with accompanying control bus, a network, or other subsystem.

The memory may form part of a storage medium for storing information, such as application data, screen information, programs, etc., part of which may be in the form of a database. The storage medium may be a hard drive, for example, or any other storage means that can retain data, including other magnetic and/or optical storage devices. A network interface card (NIC) 64 allows the computational unit 6 to communicate with other devices.

Further, a database 66 is operatively coupled to the computational unit 6. Although shown external to the computational unit 6, the database 66 may reside within memory 62 of the comptuational unit. Alternatively, the database 66 may be located remote from the computational unit 6. The database 66 can include data describing general, generic or statistically derived three-dimensional models of the structure (e.g., of the femur).

A person having ordinary skill in the art of computer programming and applications of programming for computer systems would be able in view of the description provided herein to program a computational unit 6 to operate and to carry out the functions described herein. Accordingly, details as to the specific programming code have been omitted for the sake of brevity. Also, while software in the memory 62 or in some other memory of the computer and/or server may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for generating a three-dimensional model of a structure based on at least one two-dimensional image of the structure, comprising:
   obtaining a generic or statistically-based three-dimensional model of the structure;
   determining at least one image feature from the at least one two-dimensional image;
   determining an orientation of the generic or statistically-based three-dimensional model of the structure relative to the at least one two-dimensional image of the structure, wherein the determined orientation provides at least one image feature of a two-dimensional projection of the three-dimensional model that matches the at least one two-dimensional image feature; and
   after determining the orientation of the generic or statistically-based three-dimensional model, morphing a form or shape of the generic or statistically-based three-dimensional model to fit the at least one two-dimensional image.

2. The method according to claim 1, further comprising obtaining the at least one two-dimensional image of the structure.

3. The method according to claim 2, further comprising calibrating the at least one two-dimensional image of the structure.

4. The method according to claim 2, wherein the at least one two-dimensional image is a fluoroscopic image or x-ray image.

5. The method according to claim 1, wherein the image feature is at least one of the contour, outline, shape, or silhouette of the imaged structure or of the projected model.

6. The method according to claim 1, wherein determining a general three-dimensional model includes using a Point Distribution Model (PDM) as the three-dimensional model.

7. The method according to claim 1, further comprising using a non-rigid two-dimensional point matching process to determine the orientation of the three-dimensional model relative to the at least one two-dimensional image.

8. The method according claim 7, further comprising iteratively performing the two-dimensional point matching process.

9. The method according to claim 8, wherein performing the two-dimensional point matching process includes using a symmetric injective nearest-neighbour mapping operator.

10. The method according to claim 7, wherein using a non-rigid two-dimensional point matching process includes using a two-dimensional thin-plate spline based deformation to find a fraction of best matched two-dimensional point pairs between features detected from the two-dimensional images and those extracted from the three-dimensional model.

11. The method according to claim 10, further comprising using the obtained two-dimensional point pairs to set up a set of three-dimensional point pairs.

12. A non-transitory computer readable storage medium embodying a computer program for generating a three-dimensional model of a structure based on at least one two-dimensional image of the structure, comprising:
- code that obtains a generic or statistically-based three-dimensional model of the structure;
- code that determines at least one image feature from the at least one two-dimensional image;
- code that determines an orientation of the generic or statistically-based three-dimensional model of the structure relative to the at least one two-dimensional image of the structure, wherein the determined orientation provides at least one image feature of a two-dimensional projection of the three-dimensional model that matches the at least one two-dimensional image feature; and
- code that morphs a form or shape of the generic or statistically-based three-dimensional model to fit the at least one two-dimensional image after determining the orientation of the general three-dimensional model.

13. An apparatus for generating a three-dimensional model of a structure, comprising:
- an imaging device operative to obtain at least one two-dimensional image of the three-dimensional structure; and
- a computer operatively connected to the imaging device and to a database, said database storing a plurality of generic or statistically-based models of the structure, said computer including
- logic that commands the imaging device to obtain the at least one two-dimensional image of the three-dimensional structure,
- logic that obtains a generic or statistically-based three-dimensional model of the structure from the database,
- logic that determines at least one image feature from the at least one two-dimensional image,
- logic that determines an orientation of the generic or statistically-based three-dimensional model of the structure relative to the at least one two-dimensional image of the structure, wherein the determined orientation provides at least one image feature of a two-dimensional projection of the three-dimensional model that matches the at least one two-dimensional image feature, and
- logic that morphs a form or shape of the generic or statistically-based three-dimensional model to fit the at least one two-dimensional image after determining the orientation of the generic or statistically-based three-dimensional model.

14. The method according to claim 9, wherein using a symmetric nearest neighbour mapping operator includes using a first point on a detected edge in the image and a second point on a two-dimensional projection of an apparent contour as a pair of symmetric injective nearest neighbours when the second point is the closest two-dimensional projection to the first point and the first point is the closest point in the detected edge to the second point.

15. The method according to claim 1, wherein determining an orientation includes performing rigid matching to determine the orientation of the three-dimensional model relative to the at least one two dimensional image.

16. The method according to claim 15, wherein determining an orientation includes performing non-rigid two-dimensional point matching process to determine the orientation of the three-dimensional model relative to the at least one two-dimensional image.

17. The method according to claim 15, wherein performing rigid matching includes iteratively performing rigid matching.

18. The method according to claim 16, wherein morphing a form or shape of the general three-dimensional model includes using elastic matching to morph the form or shape of the generic three-dimensional model.

\* \* \* \* \*